Figure 1:
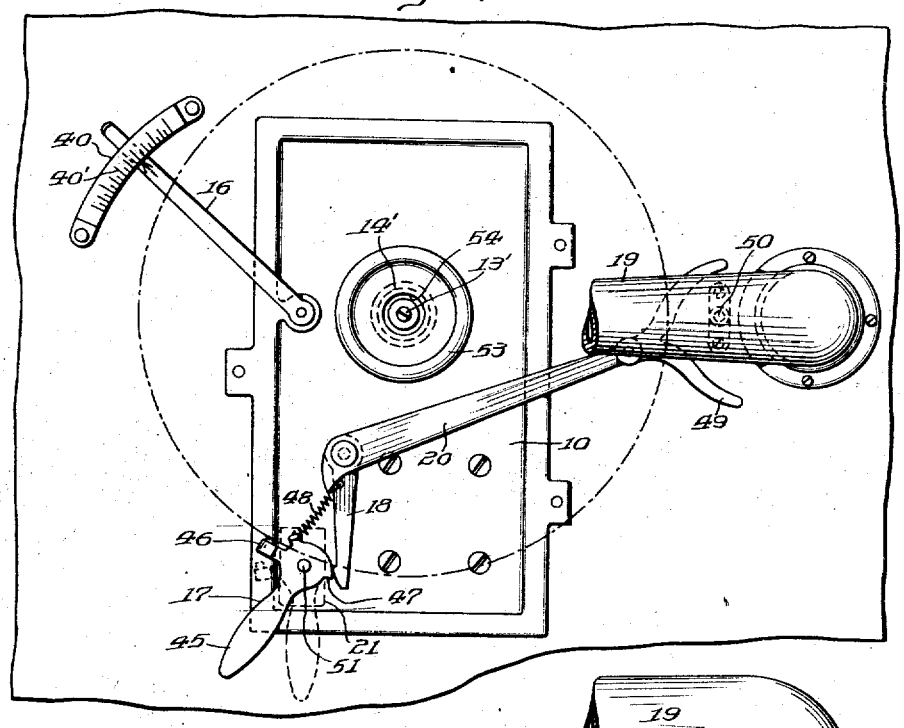

May 5, 1925.

Re. 16,063

L. P. VALIQUET

MOTOR DRIVE FOR TALKING MACHINES

Original Filed March 3, 1921 3 Sheets-Sheet 1

INVENTOR

Louis P. Valiquet.

WITNESS

H. J. Hartman.

BY

Anderson & Moulton

ATTORNEYS

May 5, 1925.

Re. 16,063

L. P. VALIQUET

MOTOR DRIVE FOR TALKING MACHINES

Original Filed March 3, 1921 3 Sheets-Sheet 2

INVENTOR

Louis P. Valiquet.

BY Anderson & Moulton

ATTORNEYS.

WITNESS

F. J. Hartman.

May 5, 1925. Re. 16,063

L. P. VALIQUET

MOTOR DRIVE FOR TALKING MACHINES

Original Filed March 3, 1921 3 Sheets-Sheet 3

INVENTOR
Louis P. Valiquet.

WITNESS
F. J. Hartman.

BY Anderson & Moulton
ATTORNEYS

Reissued May 5, 1925. Re. 16,063

UNITED STATES PATENT OFFICE.

LOUIS P. VALIQUET, OF CHICAGO, ILLINOIS, ASSIGNOR, BY MESNE ASSIGNMENTS, TO VICTOR TALKING MACHINE COMPANY, OF CAMDEN, NEW JERSEY, A CORPORATION OF NEW JERSEY.

MOTOR DRIVE FOR TALKING MACHINES.

Original No. 1,465,772, dated August 21, 1923, Serial No. 449,404, filed March 3, 1921. Application for reissue filed July 24, 1924. Serial No. 728,046.

*To all whom it may concern:*

Be it known that I, LOUIS P. VALIQUET, a citizen of the United States, and a resident of Chicago, in the county of Cook and State of Illinois, have invented certain new and useful Improvements in Motor Drives for Talking Machines, of which the following is a specification.

My invention provides an improved motor-drive for talking machines and in some of its features, has particularly to do with constructions wherein an electric motor is used as the source of power. It is understood that an electric motor may be employed to drive the shaft for the turntable of a record, or the table itself of a talking machine, that the table-rotation must be speed-governed and that the operation of the machine must be readily controllable to start or stop it. But in attempting any mere substitution of a small electric motor for the customary spring motor of a disc record talking machine, one encounters many co-related difficulties and problems that have not heretofore been successfully solved.

The general object of my invention is to provide a commercially satisfactory, efficient, durable and inexpensive construction utilizing an electric motor as a power source and coordinating and improving the features of speed-governing and of starting and stopping control in such a manner as to insure fully satisfactory operation of the mechanism and its substantial "foolproofness" or protection from damage by careless operation.

One of the objects of my invention is to provide a talking machine motor with a speed controlling and regulating device which is very sensitive and quickly responsive to slight changes in the speed of the rotation of the motor and which operates to apply a braking or speed retarding friction simultaneously at two points in the moving parts of a talking machine motor as, for example, on the governor disc, the position of which varies longitudinally of the governor shaft with variations in the speed of the motor and on a friction receiving or braking element or disc which is also driven by the motor.

A further object of my invention is to provide a brake pad or shoe which cooperates with a disc driven by the motor and to vary the friction therebetween simultaneously with the variations in the pressure between the friction pad or element of the governing mechanism and the governor disc cooperating therewith, all for the purpose of controlling and maintaining constant the speed of the motor and turntable.

A further object of my invention is to provide the governor mechanism of a motor with a second friction pad or friction applying member which may continually apply a light speed-retarding friction to the talking machine motor, and to vary the amount of said friction on said motor by and in accordance with the pressure between the governor disc and the friction-applying member cooperating therewith.

In governors usually employed to control and maintain constant the speed of talking machine motors all of the work of braking the motor to reduce the speed or to prevent an increase in speed is imposed directly upon the governor disc. The fly-balls are usually mounted on flat springs one end of each is rigidly secured to the governor spindle and the other end of each is secured to the governor disc. Thus it is that the connection between the governor disc and the motor is a yielding non-rigid connection. To apply all of the braking pressure to this disc tends to strain the governor mechanism and particularly the springs thereof, and tends to disturb the balance of the fly-balls, to loosen the spring fastenings, to produce governor noises, and to make the speed-controlling action thereof sluggish or slow.

A further object of my invention is to reduce the strain usually imposed upon the governor mechanism by transferring a substantial part of the work of braking the motor to some positively driven moving part of the talking machine motor, thus relieving the delicate part of the governing mechanism of undue work and thereby making the governor very quiet, sensitive and speed responsive.

Among the more detailed objects of my invention are to provide a mounting and co-relation of the motor, gearing elements, regulating and governing parts, and turntable which will be at once functionally adequate and mechanically economical for quantity production; to provide highly efficient governing means for close, delicate and substantially instantaneous control of the turntable speed and its maintenance at the selected speed despite current fluctuations tending to affect it; to facilitate and maintain accurate factory adustment, or user's readjustment, between the speed-governing handle and the mechanical-governor parts to insure performance accordant with the speed indicating scale, and to give the requisite range of speed variation; to associate the motor starting switch and turntable brake mechanisms for proper relative functioning and also to relate the table and gearing so that turntable brake failure may not endanger the gearing, and in other and further particulars to improve generally and in detail the associated mechanisms of the drive.

Figure 2:
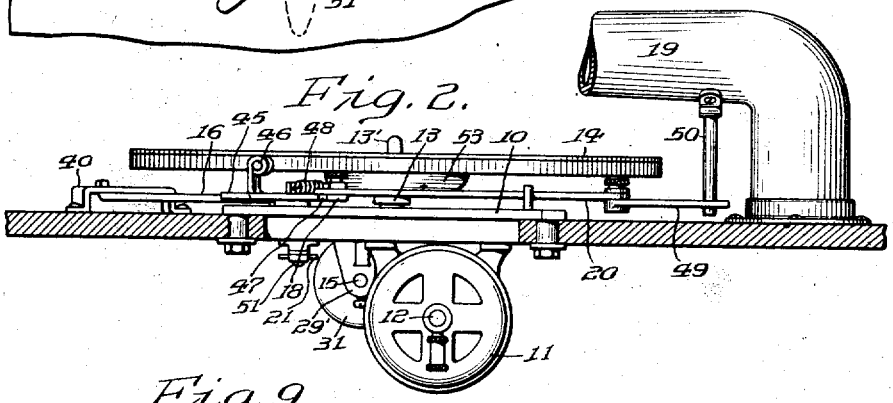
Figure 9:
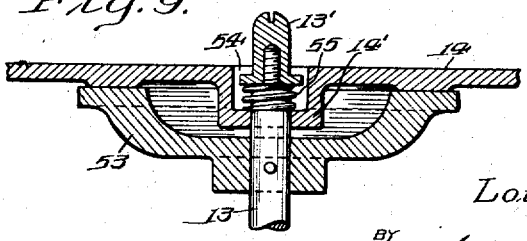
Figure 3:
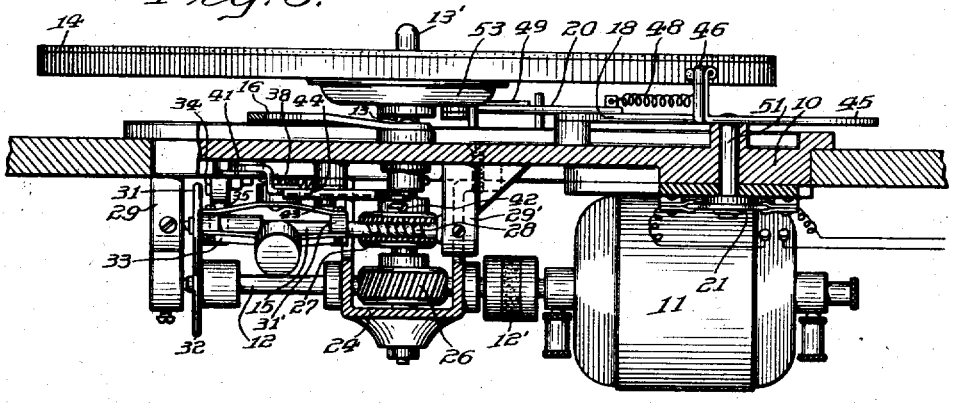
Figure 4:
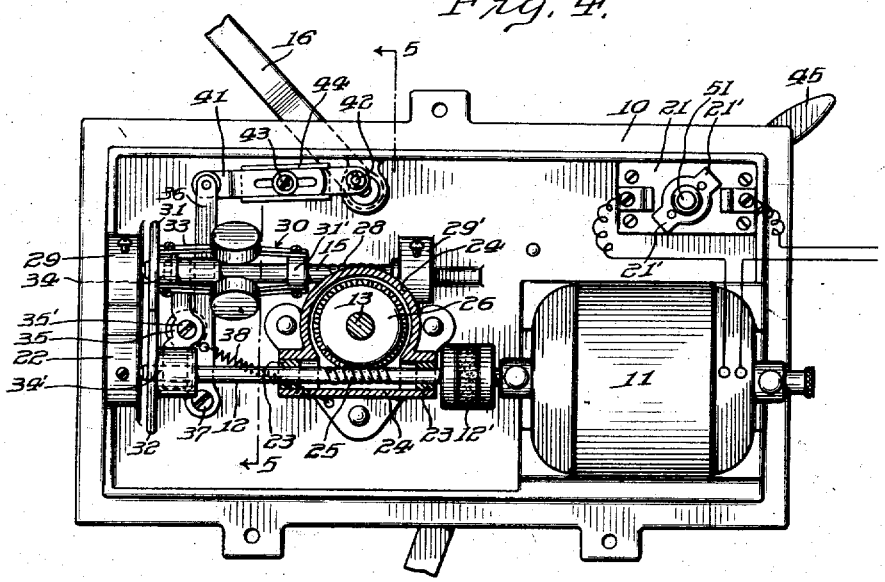
Figure 5:
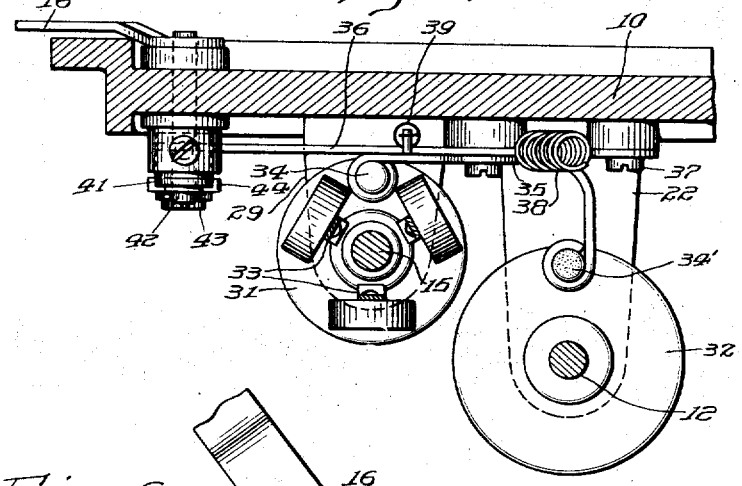
Figure 6:
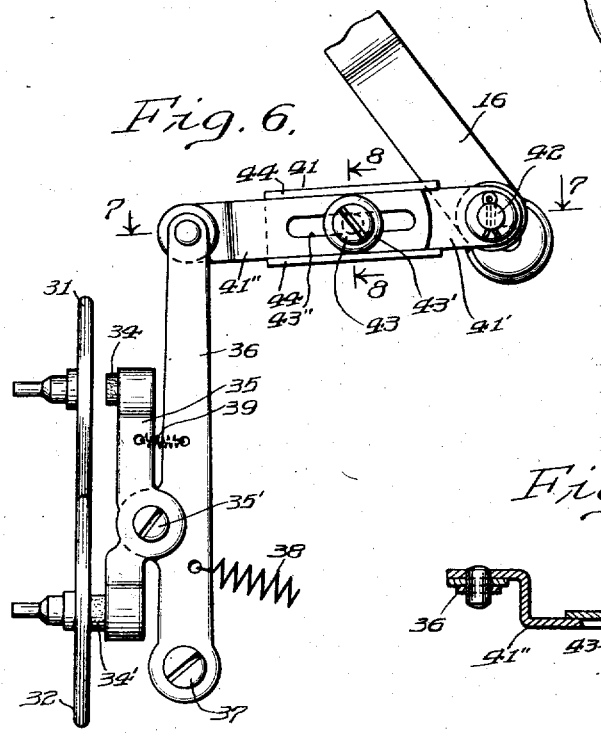
Figure 8:
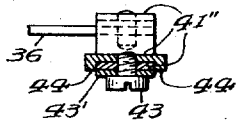
Figure 7:
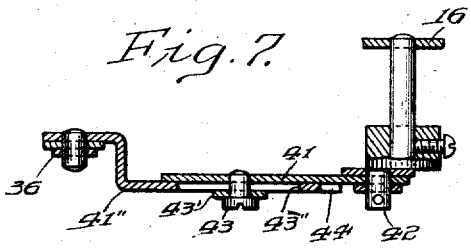

In the drawings forming a part of this specification and in which the same reference characters are used throughout the various views to designate the same parts, I have illustrated a specific embodiment of my invention for the purpose of full disclosure and wherein Fig. 1 is a plan view of the drive equipment with the record table removed and with the trip mechanism associated with the tone arm; Fig. 2 is an end elevation of the construction shown in Fig. 1, with the record turntable in place; Fig. 3 is a front elevation with parts broken away; Fig. 4 is an inverted plan view; Fig. 5 is a section on the line 5—5 of Fig. 4; Fig. 6 is a detached detail of the governor appliances; Fig. 7 is a section on the line 7—7 of Fig. 6; Fig. 8 is a section on the line 8—8 of Fig. 6; and Fig. 9 is a vertical sectional detail of the turntable mounting.

In general it will at once be apparent from the drawings that on the frame or bed plate 10 all of the mechanisms are mounted; that the suspended motor 11, through the horizontal shaft 12, worm-drives the vertical shaft 13 for the record turntable 14 above the plate 10; that this vertical turntable shaft 13 worm-drives a horizontal governor shaft 15, the speed of which is controlled by setting the governor handle 16 above the plate 10 to different positions; that the braking or release of the turntable is effected by the brake structure 17, the release latch 18 of which is subject to semi-automatic control from the tone arm 19 through a trip mechanism 20; and that the starting or stopping of the electric motor 11 is controlled by a switch 21 below the plate 10. The motor 11, designed for instance for a normal speed of say 1080 R. P. M., is mounted directly on the underside of the plate 10 and communicates its power directly to the shaft 12 preferably through a somewhat flexible coupling 12′ of known type, the power shaft 12 having a thrust bearing in the end lug 22 and a support in the bearing sleeves 23—23 provided in the hollow gear casing 24 which depends from and is secured to the bed plate 10. The turntable shaft 13, stepped in this gear casing 24, is worm-driven from shaft 12, the latter having a machine-thread worm 25 cut therein, and the shaft 13 having pinned to it a corresponding machine-thread worm-wheel 26 meshing with said worm 25. The governor shaft 15 which is worm-driven from the turntable shaft 13 may have a higher speed than the motor-driven shaft 12 which parallels it and therefore is preferably driven from a second worm-wheel 27 mounted above the first worm gear 26. This worm-wheel 27 meshes with and drives the worm 28 cut in the governor shaft 15 which is mounted to rotate in suitable bearings in the lugs 29 and 29′ respectively depending from the frame 10, and for the requiste sensitive of control, this latter worm 28 is of the undercut tooth variety. The shaft 15 carries the governor structure 30 of known type, which comprises a friction or brake receptive element or disc 31 slidable longitudinally of and on the governor shaft 15 to different positions dependent upon the speed of the shaft, a collar 31′ fixed on the said shaft 15, and the usual ball-laden governor springs 33 connecting the collar 31′ with the hub of the disc 31. The speed controller operated by the governor handle 16 cooperates with the friction disc through the friction pad or friction applying member 34 but preferably there is co-related with this pad 34 another pad 34′ to act upon the motor shaft 12. Thus, fixed to the motor shaft 12 is a friction or brake receptive element 32 preferably of a somewhat larger diameter than the governor disc 31 and preferably lying in the same or in a parallel plane. The two friction pads 34 and 34′ cooperating with the margins of these discs 31 and 32 respectively are mounted on the opposite ends of a rocker arm or lever 35 pivoted as at 35′ to the governor brake lever 36 which in turn is pivoted at 37 to the plate 10 preferably near the vertical plane through the shaft 12. The lever 36 is normally retracted by a spring 38. Between the lever 36 and rocker arm 35 is a light spring 39 tending to hold the friction pad 34 on the adjacent end of the rocker arm 35 away from the governor disc 31 and to hold the pad 34′ lightly against the motor shaft disc 32 even when the governor brake lever 36 is retracted. Thus, it is insured that the governor disc 31 is left entirely free, when the machine is idle whatever may be the position of the governor-handle 16 and this insures the starting of the motor 11 with facility. It is to be understood that a light pressure on the pad 34 of the governor disc 31 tends detrimentally to prevent prompt starting or "pick-up" of the motor because motion is table 14 fixed to the shaft 13, a heavy strain would be thrown upon the worm gearing 25—26 were one to attempt to rotate the turntable after the motor stops. For this and other reasons the turntable 14 is rotatively loose on the shaft 13 and is merely frictionally carried in rotation therewith. In the specific construction shown, the turntable shaft 13 has secured thereto near the upper end thereof a cupped carrier or support 53 on the annular horizontal rim of which the turntable 14 normally bears, the extremity of the shaft 13 extending loosely into the downwardly projecting hub 14′ of the turntable which is recessed from above as at 54 to receive the spring 55, which in turn is maintained in contact with the base of recess by a flange at the bottom of the record receiving and centering pin 13′ which may be fastened to the end of the shaft 13 by screw threads. The spring 55 insures the maintenance of an adequate frictional connection for the normal rotation of the turntable synchronously with the turntable shaft. But if one oscillates the turntable by hand, tries to turn it backward or forward or leaves it free from brake restraint while stopping the motor, no damaging strains are thrown upon the driving mechanism because of the frictional connection between the turntable and the turntable shaft.

It will be noted that not only is the construction above described advantageous in its correlation of functions to secure the best performance under the conditions imposed by an electric motor drive, but that in the mechanism structure, the mounting and the interconnection of the parts, advantageous simplicity, manufacturing economy, smallness of size and disposition of the parts for accessibility and lubrication are of distinct merit.

It is further to be noted that by the mechanism above described the work of braking the talking machine motor is distributed between the governor mechanism proper and the supplemental braking member. A part of this work of braking is transferred to and performed by a positively driven part of the motor mechanism as distinguished from a non-positively driven part, such as the governor disc driven through the springs connected to the governor spindle, and this braking action is varied directly by and in accordance with the pressure with which the governor disc bears against the governor pad. By thus relieving the governor disc of a substantial part of the work heretofore usually performed by it, the governor is rendered much more sensitive and more quickly responsive to slight variations in the speed of the motor.

I claim:

1. In a machine of the character described, the combination of a table shaft, a drive shaft and a governor shaft, provision for worm-driving the table shaft from the driving shaft and the governor shaft from the table shaft, a governor on the governor shaft having a brake-receptive element, a brake-receptive element on the drive shaft, and speed-governing-brake means coacting with both said brake-receptive elements.

2. In a machine of the character described, the combination of a table shaft, a drive shaft and a governor shaft, provision for worm-driving the table shaft from the driving shaft and the governor shaft from the table shaft, a governor on the governor shaft having a brake-receptive element, a brake-receptive element on the drive shaft, and speed-governing-brake means coacting with both said brake-receptive means, comprising a shiftable lever and a rocker arm pivoted on said lever and having on opposite sides of the pivot two brake-pads for respective cooperation with said two brake-receptive means.

3. In a drive of the character described, the combination of a drive shaft, having a brake-receptive disc, a governor shaft having a governor thereon and a governor-shiftable brake-disc, a table shaft and provision for worm-driving said table shaft from the drive shaft and worm-driving the governor shaft from the table shaft, a pivoted main governor lever, a rocker lever pivoted on said main lever and bearing on opposite arms brake pads for the two respective brake-discs, and yielding means normally tending to tilt said rocker lever away from the brake disc of the governor.

4. In a drive of the character described, the combination of an electric motor, a shaft directly driven thereby bearing a brake-member rotatable therewith, a table shaft, worm gearing having machine threads between the drive shaft and the table shaft, a governor shaft having an undercut worm, geared to the main shaft, said shaft carrying a governor having a movable brake-receptive surface, a rocker lever having pads for respective coaction with said two brake surfaces of the governor and the drive shaft, a main governor lever pivotally carrying said rocker lever, a spring interposed between said two levers tending to rock said rocker lever to effect brake contact with the drive shaft brake surface and out of contact with the governor brake surface, and a handle for moving the main governor lever.

5. In a drive of the character described, the combination of an electric motor, a shaft directly driven thereby bearing a brake-member rotatable therewith, a table shaft, worm gearing having machine threads between the drive shaft and the table shaft, a governor shaft having an undercut worm, geared to the main shaft, said shaft carrytransmitted to the governor shaft 15 by a gearing which consists of a worm gear driving a worm. A light contact of the pad 34′ on the friction disc 32 of the motor shaft 12, however, produces no such detrimental effect on account of the direct drive thereto. In practice I find that the motor 11 will start perfectly with the construction above described.

In starting the mechanism as the governor shaft increases in speed and finally obtains full speed, the friction disc 31 engages, moves longitudinally of the governor shaft 15 and finally touches or engages the friction pad 34 and pressing against the pad 34 causes the pad 34′ to be correspondingly pressed against the brake disc 32 through the arrangement of the rocker arm 35. This takes the strain off of the governor mechanism and applies a braking friction directly to the motor shaft giving such delicacy of control and such promptness of response to the movement of the handle 16 as to produce almost instantaneous response to any movement of the handle 16 to vary the speed of the motor and turntable. In practice, relatively small adjustments of the handle 16 made while sound is being reproduced from a record are responded to so promptly that to the auditor there is little or none of the customary slurring between pitches of the music or voice that ordinarily attends speed adjustment while a talking machine is reproducing sound.

The governor handle 16 has a crank connection under the plate 10 with a governor lever 36 and the handle 16 preferably cooperates with a customary scale 40 which may be marked with speed-indicating graduation 40′. It is important that the connection between the handle 16 and the governor mechanism be so shaped and so readily adjustable that the scale indicated table-speed (particularly around the normal 80 R. P. M. speed) and the actual performance of the turn-table shall tally. I prefer to gear the vertical shaft 13 to the motor shaft 12 so that at the normal speed of the ordinary shaft (i. e. 80 R. P. M.) the motor will be running at say 40 revolutions below its rated speed, giving a leeway to take care of voltage drop in the supply line and I prefer that under these conditions the gearing shall drive the governor shaft at about 1250 R. P. M. In setting or readjusting for these preferred conditions, the handle 16 is arbitrarily set at 80, the governor lever 36 is hand moved to establish the requisite turntable speed (by the use of the speed indicator temporarily applied thereto) and then an adjustable element of operative-connection between the two levers is fixed in its proper adjustment. For this connection an adjustable link 41 is employed, the same comprising two overlapping flat sections 41′ and 41″, one section 41′ being pivoted to the crank 42 of the handle 16 and the other section 41″ being pivoted to the end of the governor lever 36, the two overlapping sections being adjustably connected together by a screw 43 passing through a washer 43′ and a slot 43″ in the section 41″ and the section 41″ being preferably guided between parallel shoulders or ledges 44 struck up or otherwise formed on the sides of the link section 41′.

The truntable 14 is preferably quite heavy for fly-wheel effect and the mounting therefor, the provision for braking it, and the corelation of the brake mechanism with the motor switch are preferably organized in a manner that is of particular advantage when an electric motor is used as the prime mover or power element with the sensitive and adequate governing mechanism above described.

The turntable brake 17 above the plate 10 may be the usual bell crank lever with a finger piece or handle 45 and a brake pad arm 46, the pad of which is adapted to be brought into and out of engagment with the turntable. The lever 17 is preferably provided with a shoulder 47 coacting with the latch member 18 under the tension of the spring 48 in known fashion. The latch member 18 is conveniently subject to semi-automatic control by the trip arm 20, the adjustable prong 49 if which coacts with the pin 50 projecting downwardly from and rigid with the tone arm 19, also in known fashion. The shaft 51 which turns with the brake lever 17 carries, below the plate 10 the movable contact arm 21′ of the motor switch 21 and is arranged to open the motor switch before the brake is applied and to release the turntable before the motor switch is closed. The advantage of this is that the motor may not receive current until the turntable is free to rotate nor while the brake is applied to the turntable, but it makes possible a careless manual operation of the brake lever 17 to leave the turntable free from the braking effect of the brake 17 while the switch lever 45 is in an intermediate position (after freeing the turntable and before closing the current through the switch 21) or when the current to the switch is broken by an outside or main controlling switch or when the plug to which the wires from the switch are connected is removed from the socket. Under such conditions with the motor 21 stopped one might try to rotate the turntable by hand. In this connection it will be understood that the machine-toothed worm and gear connection and drive 25—26 between the motor shaft 12 and the turntable shaft 13 while effective to impart driving power from the worm 25 to the wheel 26 is practicably incapable of transmitting motion from the wheel 26 to the worm 25 and therefore were the turning a governor having a movable brake-receptive surface, a rocker lever having pads for respective coaction with said two brake surfaces of the governor and the drive shaft, a main governor lever pivotally carrying said rocker lever, a spring interposed between said two levers tending to rock said rocker lever to effect brake contact with the drive shaft brake surface and out of contact with the governor brake surface, and means for moving the main governor lever, comprising a handle and quick-adjustment link-connection between the handle and the main governor lever.

6. In a drive of the character described, a base, table shaft, means for driving the table shaft, a governor acting on the table shaft, governor lever, a hand-lever cooperating with a scale, and operative connections between said hand lever and governor lever comprising a two-part link and quick-adjustment connection between the parts of said link.

7. In a motor mechanism, the combination of a motor, a brake receptive member rotated thereby, a governor shaft driven by said motor, a governor disc carried by and rotating with said governor shaft and movable longitudinally thereon to different positions depending upon the speed of the rotation of said governor shaft, and means cooperating with said governor disc and with said brake receptive member to apply a braking friction to said member and motor and to vary said friction by and in accordance with the pressure between said governor disc and said means.

8. In a motor mechanism, the combination with a motor, of a governor driven by said motor and including a governor disc and a governor shaft upon which said disc is mounted, said disc tending to move to different positions longitudinally of said shaft by and in accordance with the speed of rotation of said shaft, a member also driven by said motor and providing a brake receptive surface, and friction applying means held pressed against said brake receptive surface by said governor disc when said motor is normally running and operative to vary the pressure between said means and said surface by and in accordance with the pressure with which said governor disc bears against said means.

9. In a motor mechanism the combination with a motor and a speed governor therefor, including a governor shaft driven by said motor and a disc longitudinally slidable on said shaft by and in accordance with the speed of said shaft, of a brakable member also driven by said motor, and means having one portion extending into the path of the longitudinal movement of said disc and having another portion bearing against said brakable member, whereby the pressure with which said means bears against said brakable member varies by and in accordance with the pressure with which said disc bears against said means, when the motor is running at normal speeds.

10. In a motor mechanism, the combination of a driving motor, a governor shaft driven by said motor, a governor disc carried by said governor shaft and movable longitudinally thereon to different positions depending upon the speed of rotation of said shaft, of a brakable element positively driven by said motor, a lever pivoted between the ends thereof and having its ends respectively adjacent said governor disc and said brakable element, a friction pad on one end of said lever to cooperate with said governor disc, and a friction pad on the other end of said lever arranged to apply friction to said element whereby variations in the pressure between said governor disc and the friction pad cooperating therewith correspondingly varies the pressure between said braking element and the friction pad cooperating therewith.

11. In a motor mechanism, the combination with a motor, of a brake receptive member positively driven thereby and provided with a braking surface, a governor shaft also positively driven by said driving shaft and provided with a friction surface rotated by and longitudinally movable with respect to said governor shaft, a lever pivoted between the ends thereof and having its ends respectively adjacent said braking surface and said friction surface, a pair of friction members mounted respectively on the ends of said lever and engaging said friction surface and said braking surface respectively when said motor is revolving at normal speeds, whereby any variation in the pressure between said friction surface and the friction member adjacent thereto produces a corresponding variation in the pressure between the other of said friction members and the braking surface cooperating therewith.

12. In a motor mechanism, the combination with a motor of a brake disc positively driven by said motor, a governor shaft also driven by said motor, a governor disc mounted on and rotated with and longitudinally movable with respect to said governor shaft, a lever pivoted between the ends thereof and having its ends respectively adjacent said governor disc and said brake disc, a pair of friction members mounted respectively on the ends of said lever and engaging said disc respectively when said motor is revolving at normal speeds, whereby any variation in the pressure between said governor disc and said friction member cooperating therewith produces a corresponding variation in the pressure between the other friction member and the brake disc cooperating therewith.

13. In a motor mechanism, the combination with a motor, a governor shaft driven therefrom and provided with a governor disc longitudinally movable thereon to different positions depending upon the speed at which said shaft is rotating, a brake disc positively driven by said motor, a pivoted lever, a pair of friction pads mounted on said lever, one on each side of the pivot of said lever and respectively engaging said discs when said motor is running at normal speeds, and means to bodily adjust the position of said pivoted lever with respect to said discs to vary and adjust the speed of said motor.

14. In a talking machine motor including a speed responsive governor comprising a governor disc and a friction pad cooperating therewith, the combination of a supplemental braking mechanism for the motor, the braking action of which is varied by and in accordance with the pressure with which said governor disc bears against said friction pad.

15. The combination with a motor, of a centrifugal governor driven by said motor and comprising a shaft and a friction member rotated by said shaft and movable longitudinally thereof to different positions dependent upon the speed of said shaft, a brake receptive member also positively driven by said motor and movable friction applying means engaging said brake receptive member and said friction member when said motor is normally running, whereby the pressure between said friction applying means and said brake receptive member is varied by and in accordance with the pressure with which said friction member of said governor presses against said friction applying means.

16. The combination with a motor, of a centrifugal governor driven by said motor and comprising a shaft and a friction member rotated by said shaft and movable longitudinally thereof to different positions dependent upon the speed of said shaft, a brake receptive member also positively driven by said motor, friction applying means engaging said brake receptive member and said friction member when said motor is normally running, whereby the pressure between said friction applying means and said brake receptive member is varied by and in accordance with the pressure with which said friction member of said governor presses against said friction applying means, and means to bodily adjust the position of said movable friction applying means to adjust the speed of said motor.

In witness whereof, I have hereunto set my hand this 18th day of July, 1924.

LOUIS P. VALIQUET.